(12) United States Patent
Frenot

(10) Patent No.: US 11,081,014 B2
(45) Date of Patent: Aug. 3, 2021

(54) LANDING ASSISTANCE METHOD AND SYSTEM ASSOCIATED WITH A DISPLAY DEVICE OF AN AIRCRAFT

(71) Applicant: Airbus Operations SAS, Toulouse (FR)

(72) Inventor: Alexis Frenot, Toulouse (FR)

(73) Assignee: Airbus Operations SAS

( * ) Notice: Subject to any disclaimer, the term of this patent is extended or adjusted under 35 U.S.C. 154(b) by 0 days.

(21) Appl. No.: 16/840,604

(22) Filed: Apr. 6, 2020

(65) Prior Publication Data

US 2020/0327815 A1 Oct. 15, 2020

(30) Foreign Application Priority Data

Apr. 10, 2019 (FR) ...................................... 19 03818

(51) Int. Cl.
*G08G 5/02* (2006.01)
*B64D 43/00* (2006.01)
*G01C 21/00* (2006.01)
*G01C 21/20* (2006.01)

(52) U.S. Cl.
CPC ............. *G08G 5/025* (2013.01); *B64D 43/00* (2013.01); *G01C 21/005* (2013.01); *G01C 21/20* (2013.01)

(58) Field of Classification Search
CPC ...... G08G 5/025; B64D 43/00; G01C 21/005; G01C 21/20
See application file for complete search history.

(56) References Cited

U.S. PATENT DOCUMENTS

| 5,382,954 A | * | 1/1995 | Kennedy, Jr. | ........ G01C 23/005 340/961 |
| 10,311,738 B2 | * | 6/2019 | Pratap | ................... G08G 5/0013 |
| 2006/0164262 A1 | * | 7/2006 | Wyatt | ..................... G01C 23/00 340/973 |
| 2010/0141482 A1 | | 6/2010 | Wyatt et al. | |
| 2012/0026190 A1 | | 2/2012 | He et al. | |
| 2015/0362332 A1 | * | 12/2015 | Vernaleken | ............ G01C 23/00 701/4 |
| 2018/0156633 A1 | * | 6/2018 | Fadden | .................. B64D 43/02 |
| 2018/0281988 A1 | * | 10/2018 | Tellechea | ............... G08G 5/025 |
| 2019/0056901 A1 | * | 2/2019 | He | ......................... B64D 43/00 |

OTHER PUBLICATIONS

French Search Report for Application No. FR1903818, dated Mar. 11, 2020, pp. 1-2.

* cited by examiner

*Primary Examiner* — Mohamed Barakat
(74) *Attorney, Agent, or Firm* — Lerner, David, Littenberg, Krumholz & Mentlik, LLP

(57) ABSTRACT

A landing assistance system includes a module for acquiring environment and current flight parameters of the aircraft, a module for generating flight and navigation symbology to be displayed on the display device at least from current flight parameters, a module for generating a land topography of terrain overflown by the aircraft, a transmission module configured to transmit a signal to the display device that represents the flight and navigation symbology and the synthetic representation, the symbology generating module including a sub-module for displaying a mock-up at a predetermined non-zero positive pitch angle relative to a median line of the display zone. The system allows a landing to occur in good conditions by virtue of the enlargement of the lower part of the display zone.

14 Claims, 9 Drawing Sheets

LANDING ASSISTANCE METHOD AND SYSTEM ASSOCIATED WITH A DISPLAY DEVICE OF AN AIRCRAFT

FIELD OF THE INVENTION

The present invention relates to a landing assistance system and to a method for an aircraft associated with a display device, in particular with a primary flight display configured to display a flight and navigation symbology and a synthetic land topography of terrain overflown by the aircraft.

BACKGROUND OF THE INVENTION

A Primary Flight Display (PFD) generally displays an image depicting a flight and navigation symbology generated by a Control and Display System that can be denoted, for example, CDS, or even by an Electronic Instrument System (EIS). Furthermore, for a Primary Full Format Flight Display, also called PF3D display, a Synthetic Vision System (SVS) at the same time generates an image depicting a three-dimensional topology of the terrain overflown by the aircraft. This last image is placed in the background of the image depicting the flight and navigation symbology. However, a PF3D display with a flight and navigation symbology display identical to a flight and navigation symbology display of a PFD display is not optimized for landing the aircraft. Indeed, the representation of the flight and navigation symbology is not adapted to a three-dimensional topology during a landing.

BRIEF SUMMARY OF THE INVENTION

Aspects of the present invention may overcome these disadvantages by proposing a method and a system for assisting landing with a PF3D display.

An aspect of the invention relates to a landing assistance method associated with a display device of an aircraft, the display device being configured to display a flight and navigation symbology on a display zone, the display zone having a coordinate system, which includes an abscissa axis indicating a yaw angle relative to a zero yaw reference line and an ordinate axis indicating a pitch axis of the aircraft relative to a zero pitch reference line.

According to an aspect of the invention, the method comprises at least:
  an acquisition step, implemented by an acquisition module, involving acquiring environment data and current flight parameters of the aircraft, at least including an attitude, an altitude, a three-dimensional position and a heading parameter;
  a symbology generating step, implemented by a symbology generating module, involving generating a flight and navigation symbology to be displayed on the display device from at least the current flight parameters;
  a land topography generating step, implemented by a land topography generating module, involving generating a synthetic representation of a land topography of terrain overflown by the aircraft from at least the attitude, the heading, the three-dimensional position and the environment data;
  a transmission step, implemented by a transmission module, involving transmitting a signal to the display device that represents the flight and navigation symbology and the synthetic representation.

The symbology generating step comprises at least one sub-step of determining the position of a mock-up, implemented by a mock-up position determination sub-module, involving determining a display position of a mock-up of the aircraft on the display zone, the position of the mock-up being determined so that the mock-up is displayed at a predetermined non-zero positive pitch angle relative to a median line of the display zone, the median line being parallel to the abscissa axis.

Thus, by virtue of the offset of the mock-up along the predetermined pitch angle, a landing occurs under better conditions during low-speed approaches when the aircraft AC has an upward nose and the aircraft AC follows a negative slope, for example, a negative slope equal to $-3°$. Indeed, the lower part of the display zone 3 has more room for information that is useful for the landing.

Furthermore, the symbology generating step comprises:
  a sub-step of determining a flight path vector, implemented by a flight path vector determination sub-module, involving determining a position of a flight path vector relative to the mock-up on the display zone at least from the attitude;
  a sub-step of determining the position of the zero pitch line, implemented by a zero pitch position determination sub-module, involving determining a position of the zero pitch reference line on the display zone at least from the attitude,
if the position of the flight path vector determined in the sub-step of determining a flight path vector is below a lower pitch angle threshold, the zero pitch reference line being intended to be depicted on the display zone between a first upper pitch angle relative to the flight path vector and a first lower pitch angle relative to the flight path vector,
if the position of the flight path vector determined in the sub-step of determining the flight path vector is above an upper pitch angle threshold, the zero pitch reference line being intended to be depicted on the display zone between a second upper pitch angle and a second lower pitch angle.

Furthermore, the land topography generating step comprises a sub-step of generating a terrain zone, implemented by a terrain zone generating sub-module, involving generating a terrain zone intended to be displayed on the display zone when the aircraft has a pitch angle that is higher than an upper pitch angle that can be displayed on the display zone; and in that the land topography generating step comprises a sub-step of generating a sky zone, implemented by a sky zone generating sub-module, involving generating a sky zone intended to be displayed on the display zone when the aircraft has a pitch angle that is lower than a lower pitch angle that can be displayed on the display zone.

Moreover, the symbology generating step comprises a sub-step of determining a flight path director, implemented by a flight path director determination sub-module, involving determining a position of a flight path director relative to the mock-up on the display zone from a path order;
  if the position of the flight path director is located, on the one hand, between a third upper pitch angle and a third lower pitch angle and, on the other hand, between a first upper yaw angle and a first lower yaw angle, the flight path director being intended to be depicted on the display zone in a first configuration;
  if the position of the flight path director is located in a position that is simultaneously higher than the third upper pitch angle, lower than the third lower pitch angle, higher than the first upper yaw angle and lower than the first lower yaw angle, the flight path director being intended to be depicted on the display zone in a second configuration;

if the position of the flight path vector is located, on the one hand, between a fourth upper pitch angle lower than the third pitch angle and a fourth lower pitch angle higher than the third lower pitch angle and, on the other hand, between a second upper yaw angle lower than the first upper yaw angle and a second lower yaw angle higher than the first lower yaw angle, the flight path vector being intended to be depicted on the display zone in the first configuration;

if the position of the flight path vector is located in a position that is simultaneously higher than the fourth upper pitch angle, lower than the fourth lower pitch angle, higher than the second upper yaw angle and lower than the second lower yaw angle, the flight path vector being intended to be depicted on the display zone in the second configuration.

According to one feature, the symbology generating step comprises a sub-step of generating a roll scale, implemented by a roll scale generating sub-module, involving generating a roll scale intended to be displayed on the display zone, if the aircraft has a roll angle between a first roll angle and a second roll angle, the roll scale being limited between the first roll angle and the second roll angle, if the aircraft has a roll angle lower than the first roll angle or higher than the second roll angle, the roll scale being extended between a third roll angle lower than the first roll angle and a fourth roll angle higher than the second roll angle.

According to another feature, the symbology generating step comprises a sub-step of generating a heading scale, implemented by a heading scale generating sub-module, involving generating a heading scale intended to be displayed on the display zone, the heading scale being coincident with the zero pitch reference line, the heading scale being adapted to the synthetic representation of the land topography of the terrain overflown by the aircraft generated in the land topography generating step, the heading scale comprising a first symbol indicating the current heading of the aircraft having a position on the heading scale that is determined from the heading acquired in the acquisition step and a second symbol indicating a selected heading having a position that is determined from a heading order.

Furthermore, the symbology generating step comprises a sub-step of generating a pitch scale, implemented by a pitch scale generating sub-module, involving generating a pitch scale between −20° and +20°.

Moreover, when an order to lock the flight path vector is transmitted to the symbology generating module, the flight path vector is intended to be permanently displayed along the abscissa axis along a median line of the display zone parallel to the ordinate axis as a function of the position determined by the flight path vector determination sub-module, the flight path director being intended to be depicted on the display zone relative to the flight path vector, an auxiliary symbol being intended to be displayed on the display zone in a position relative to the mock-up on the display zone that corresponds to the position of the flight path vector determined in the sub-step of determining a flight path vector.

The invention also relates to a landing assistance system associated with a display device of an aircraft, the display device being configured to display a flight and navigation symbology on a display zone, the display zone having a coordinate system, which includes an abscissa axis indicating a yaw angle relative to a zero yaw reference line and an ordinate axis indicating a pitch axis of the aircraft relative to a zero pitch reference line.

According to an embodiment of the invention, the system comprises at least:
    an acquisition module configured to acquire environment data and current flight parameters of the aircraft, at least including an attitude, an altitude, a three-dimensional position and a heading parameter;
    a symbology generating module configured to generate a flight and navigation symbology and to be displayed on the display device at least from the current flight parameters;
    a land topography generating module configured to generate a synthetic representation of a land topography of terrain overflown by the aircraft at least from the attitude, the heading, the three-dimensional position and the environment data;
    a transmission module configured to transmit a signal to the display device that represents the flight and navigation symbology and the synthetic representation;
    the symbology generating module comprising at least one mock-up position determination sub-module configured to determine a display position of a mock-up of the aircraft on the display zone, the position of the mock-up being determined so that the mock-up is displayed at a predetermined non-zero positive pitch angle relative to a median line of the display zone, the median line being parallel to the abscissa axis.

Furthermore, the symbology generating module comprises:
    a flight path vector determination sub-module configured to determine a position of a flight path vector relative to the mock-up on the display zone at least from the attitude;
    a zero pitch position determination sub-module configured to determine a position of the zero pitch reference line on the display zone at least from the attitude,
    if the position of the flight path vector determined by the flight path vector determination sub-module is below a lower pitch angle threshold, the zero pitch reference line being intended to be depicted on the display zone between a first upper pitch angle relative to the flight path vector and a first lower pitch angle relative to the flight path vector,
    if the position of the flight path vector determined in the flight path vector determination sub-module is above an upper pitch angle threshold, the zero pitch reference line being intended to be depicted on the display zone between a second upper pitch angle and a second lower pitch angle.

Furthermore, the land topography generating module comprises a terrain zone generating sub-module configured to generate a terrain zone intended to be displayed on the display zone when the aircraft has a pitch angle that is higher than an upper pitch angle that can be displayed on the display zone;

and the land topography generating module comprises a sky zone generating sub-module configured to generate a sky zone intended to be displayed on the display zone when the aircraft has a pitch angle that is lower than a lower pitch angle that can be displayed on the display zone.

Moreover, the symbology generating module comprises a flight path director determination sub-module configured to determine a position of a flight path director relative to the mock-up on the display zone from a path order;

if the position of the flight path director is located, on the one hand, between a third upper pitch angle and a third lower pitch angle and, on the other hand, between a first upper yaw angle and a first lower yaw angle, the flight path director being intended to be depicted on the display zone in a first configuration;

if the position of the flight path director is located in a position that is simultaneously higher than the third upper pitch angle, lower than the third lower pitch angle, higher than the first upper yaw angle and lower than the first lower yaw angle, the flight path director being intended to be depicted on the display zone in a second configuration;

if the position of the flight path vector is located, on the one hand, between a fourth upper pitch angle lower than the third pitch angle and a fourth lower pitch angle higher than the third lower pitch angle and, on the other hand, between a second upper yaw angle lower than the first upper yaw angle and a second lower yaw angle higher than the first lower yaw angle, the flight path vector being intended to be depicted on the display zone in the first configuration;

if the position of the flight path vector is located in a position that is simultaneously higher than the fourth upper pitch angle, lower than the fourth lower pitch angle, higher than the second upper yaw angle and lower than the second lower yaw angle, the flight path vector being intended to be depicted on the display zone in the second configuration.

According to one feature, the symbology generating module comprises a roll scale generating sub-module configured to generate a roll scale intended to be displayed on the display zone, if the aircraft has a roll angle between a first roll angle and a second roll angle, the roll scale being limited between the first roll angle and the second roll angle, if the aircraft has a roll angle lower than the first roll angle or higher than the second roll angle, the roll scale being extended between a third roll angle lower than the first roll angle and a fourth roll angle higher than the second roll angle.

According to another feature, the symbology generating module comprises a heading scale generating sub-module configured to generate a first heading scale intended to be displayed on the display zone, the first heading scale being coincident with the zero pitch reference line, the first heading scale being adapted to the synthetic representation of the land topography of the terrain overflown by the aircraft generated in the land topography generating step, the first heading scale comprising a first symbol indicating the current heading of the aircraft having a position on the first heading scale that is determined from the heading acquired by the acquisition module and a second symbol indicating a selected heading having a position that is determined from a heading order.

Moreover, the symbology generating module comprises a pitch scale generating sub-module configured to generate a pitch scale between −20° and +20°.

Furthermore, when an order to lock the flight path vector is transmitted to the symbology generating module, the flight path vector is intended to be permanently displayed along the abscissa axis along a median line of the display zone parallel to the ordinate axis as a function of the position determined by the flight path vector determination sub-module, the flight path director is intended to be depicted on the display zone relative to the flight path vector, an auxiliary symbol is intended to be displayed on the display zone in a position relative to the mock-up on the display zone that corresponds to the position of the flight path vector determined by the flight path vector determination sub-module.

The invention also relates to an aircraft, in particular a transport airplane, comprising a landing assistance system associated with a display device of the aircraft, as described above.

BRIEF DESCRIPTION OF THE DRAWINGS

The invention, and the features and advantages thereof, will become more clearly apparent upon reading the description, which is provided with reference to the accompanying drawings, in which.

DETAILED DESCRIPTION

Figure 1:
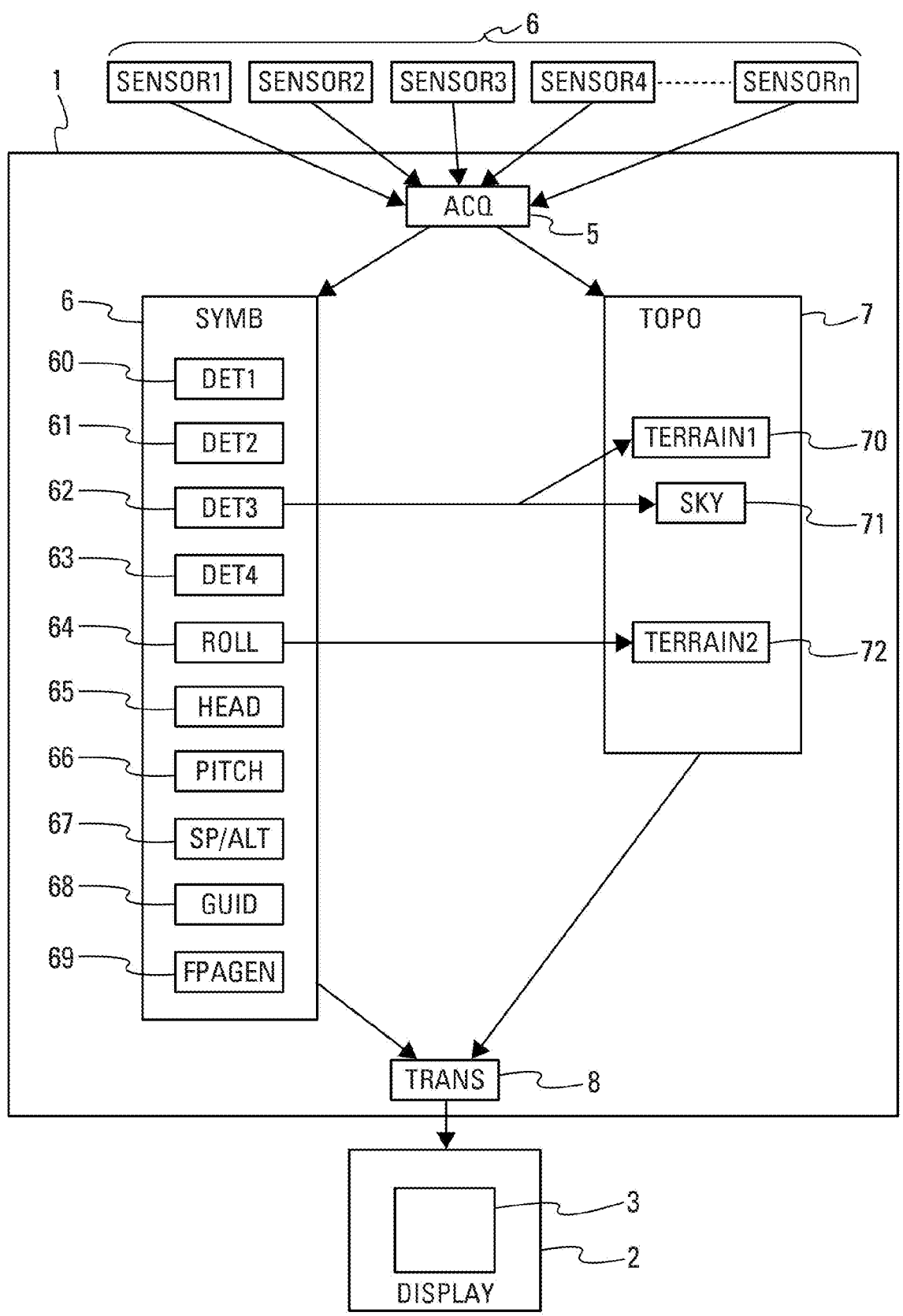
FIG. 1 schematically depicts the landing assistance system.
Figure 2:
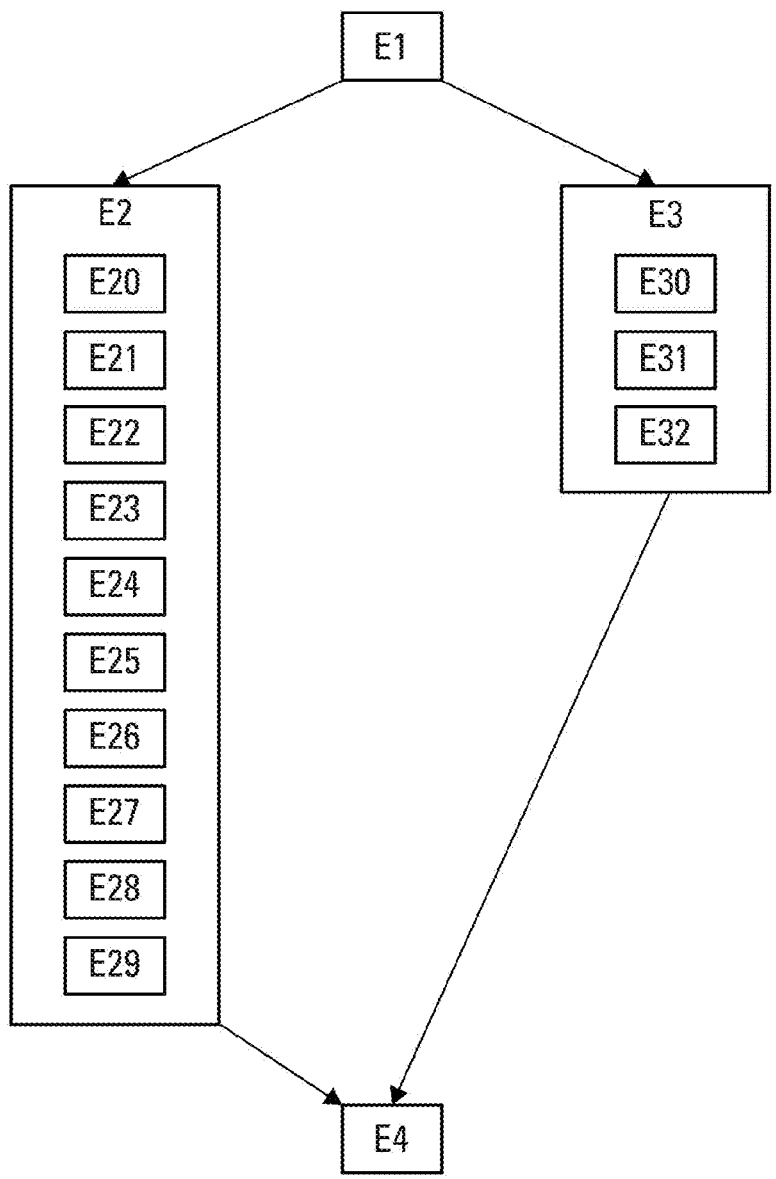
FIG. 2 schematically depicts the landing assistance method.
Figure 3:
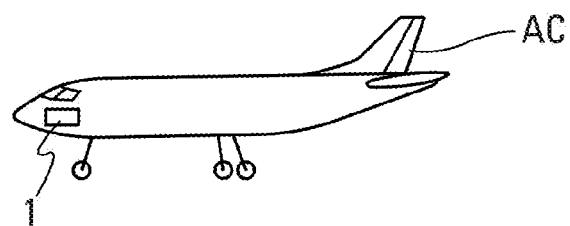
FIG. 3 depicts an aircraft with the landing assistance system on board.

An embodiment of the landing assistance system 1 associated with a display device 2 of an aircraft AC is depicted in FIG. 1. Throughout the remainder of the description, the landing assistance system 1 will be called: assistance system.

The display device DISPLAY 2 for which the assistance system 1 is intended is configured to display a flight and navigation symbology on a display zone 3. The display zone 3 has a coordinate system, including an abscissa axis and an ordinate axis. The abscissa axis indicates a yaw angle relative to a zero yaw reference line. The ordinate axis indicates a pitch angle of the aircraft AC relative to a zero pitch reference line 4.

Throughout the remainder of the description, the "lower part" of the display zone 3 or the "bottom" of the display zone 3 corresponds to the part nearest to the terrain overflown by the aircraft AC. The "upper part" of the display zone 3 or the "top" of the display zone 3 corresponds to the part furthest from the terrain overflown by the aircraft AC.

The assistance system 1 comprises an acquisition module ACQ 5 configured to acquire current flight parameters of the aircraft AC as well as environment data.

The acquisition module 5 acquires the flight parameters measured by sensors SENSOR1 SENSOR2, SENSOR3, SENSOR4, . . . , SENSORn 6. The acquisition module 5 acquires at least a current attitude of the aircraft AC, a current three-dimensional position of the aircraft AC, a current altitude of the aircraft AC, a current heading of the aircraft AC and current environment data. The environment data corresponds, for example, to data relating to the terrain overflown by the aircraft AC, data relating to one or more runways or data relating to obstacles likely to be encountered by the aircraft AC.

The assistance system 1 also comprises:
a symbology generating module SYMB 6 configured to generate a flight and navigation symbology to be displayed on the display device 2 at least from current flight parameters;
a land topography generating module TOPO 7 configured to generate a synthetic representation of a land topography of terrain overflown by the aircraft AC at least from the attitude, the heading, the three-dimensional position and the environment data;
a transmission module TRANS 8 configured to transmit a signal to the display device 2 that represents the flight and navigation symbology and the synthetic representation.

The synthetic representation of the land topography of the terrain overflown by the aircraft AC can also comprise a representation of the sky.

Figure 4:
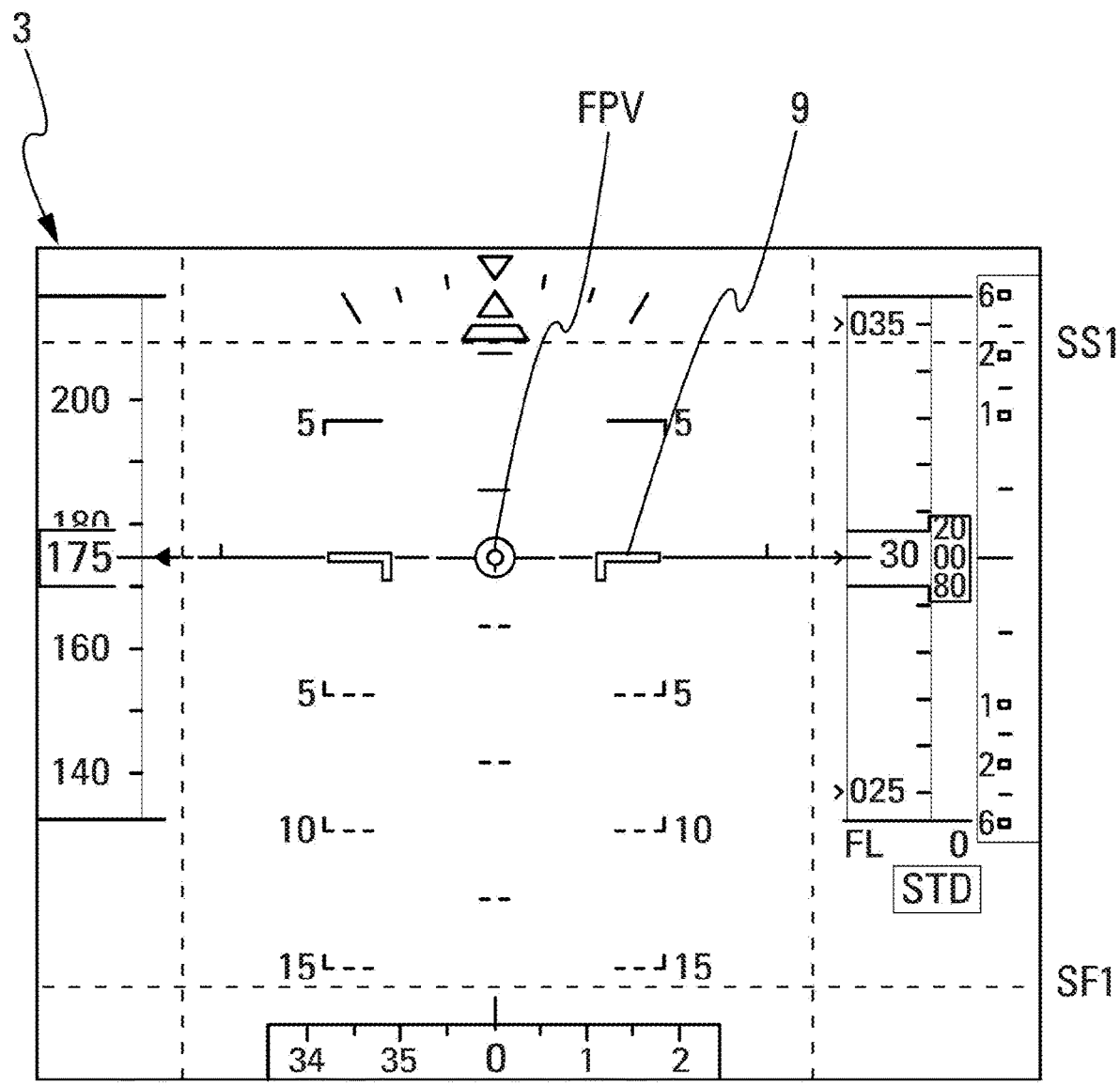
FIG. 4 depicts the display zone with the lower and upper pitch angle thresholds.

The symbology generating module 6 comprises a mock-up position determination sub-module DET1 60 that is configured to determine a display position of a mock-up 9 of the aircraft AC on the display zone 3. The position of the mock-up 9 is determined so that the mock-up 9 is displayed at a predetermined positive non-zero pitch angle α relative to a median line 10 of the display zone 3. The median line 10 is parallel to the abscissa axis (FIG. 4). The mock-up 9 is thus intended to be displayed on the display zone 3 by being offset toward the top of the display zone 3 by the predetermined pitch angle α relative to the median line 10 of the display zone 3. The mock-up 9 remains in a fixed position on the display zone 3.

This offset of the mock-up 9 toward the top of the median line 10 is particularly advantageous during low-speed approaches when the aircraft AC has an upward nose and the aircraft AC follows a negative slope, for example, a negative slope of −3°. This allows a landing to be completed in good conditions, since the lower part of the display zone 3 has more room for information useful for the landing. This useful information can correspond to the configuration of the terrain.

Advantageously, this offset remains fixed irrespective of the flight phase, even if the aircraft AC is not in an approach phase.

The median line 10 corresponds to a line that joins the centers of two opposite sides. If the display zone 3 is rectangular shaped, the median line 10 parallel to the abscissa axis joins the centers of the two opposite sides of the rectangle that are parallel to the ordinate axis.

The mock-up 9 indicates the position of the aircraft AC relative to the zero pitch reference line 4.

Preferably, the predetermined pitch angle α equals 1.5°.

The symbology generating module 6 can also comprise:
a flight path vector determination sub-module DET2 61, configured to determine a position of a flight path vector relative to the mock-up 9 on the display zone 3 at least from the attitude;
a zero pitch position determination sub-module DET3 62, configured to determine a position of the zero pitch reference line 4 on the display zone 3 at least from the attitude.

A flight path vector FPV can correspond to a symbol intended to be displayed on the display zone 3. The displayed flight path vector FPV depicts the flight path of the aircraft AC. It can also depict the drift of the aircraft AC. The drift angle corresponds to the distance between the perpendicular to a median line 101 parallel to the ordinate axis and the flight path vector FPV. The symbol can comprise arms parallel to the mock-up 9.

If the position of the flight path vector FPV determined by the flight path vector determination sub-module 61 is below a lower pitch angle threshold SF1, the zero pitch reference line 4 is intended to be depicted on the display zone 3 between an upper pitch angle AS1 relative to the flight path vector FPV and a lower pitch angle AF1 relative to the flight path vector FPV.

If the position of the flight path vector FPV determined by the flight path vector determination sub-module 61 is above an upper pitch angle threshold SS1, the zero pitch reference line 4 is intended to be depicted on the display zone between an upper pitch angle AS2 relative to the flight path vector FPV and a lower pitch angle AF2 relative to the flight path vector FPV.

Advantageously, when the position of the flight path vector FPV is located below the lower pitch angle threshold SF1 or above the upper pitch angle threshold SS1, the zero pitch reference line 4 is intended to be depicted on the display zone 3 in a "ghosted" manner. For example, the zero pitch reference line 4 is ghosted, if it is depicted by a dashed line on the display zone 3. Similarly, when the position of the flight path vector FPV is located below the lower pitch angle threshold SF1 or above the upper pitch angle threshold SS1, the flight path vector FPV is intended to be depicted on the display zone 3 in a ghosted manner. The flight path vector FPV is ghosted if it is depicted as dashed lines on the display zone 3.

In a non-limiting manner (FIGS. 4, 5 and 6), the lower pitch angle threshold SF1 equals −14.7° relative to the mock-up 9, the upper pitch angle AS1 equals −12.7° and the lower pitch angle AF1 equals −16°. The upper pitch angle threshold SS1 equals +6.5°, the upper pitch angle equals +7.8°, and the lower pitch angle equals +4.5°.

This display allows the awareness of the pilot of the aircraft AC to be improved.

Figure 5:
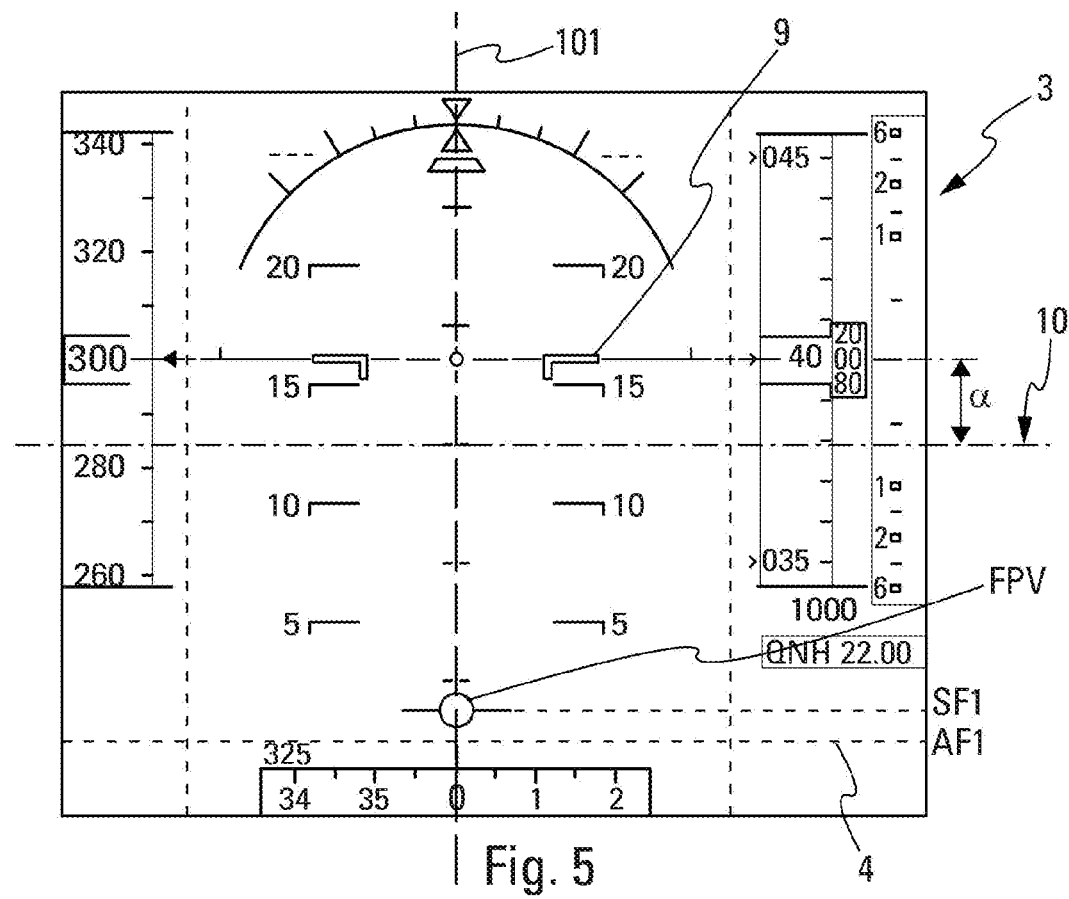
FIG. 5 depicts the display zone in the case whereby the aircraft climbs nose-up.
Figure 6:
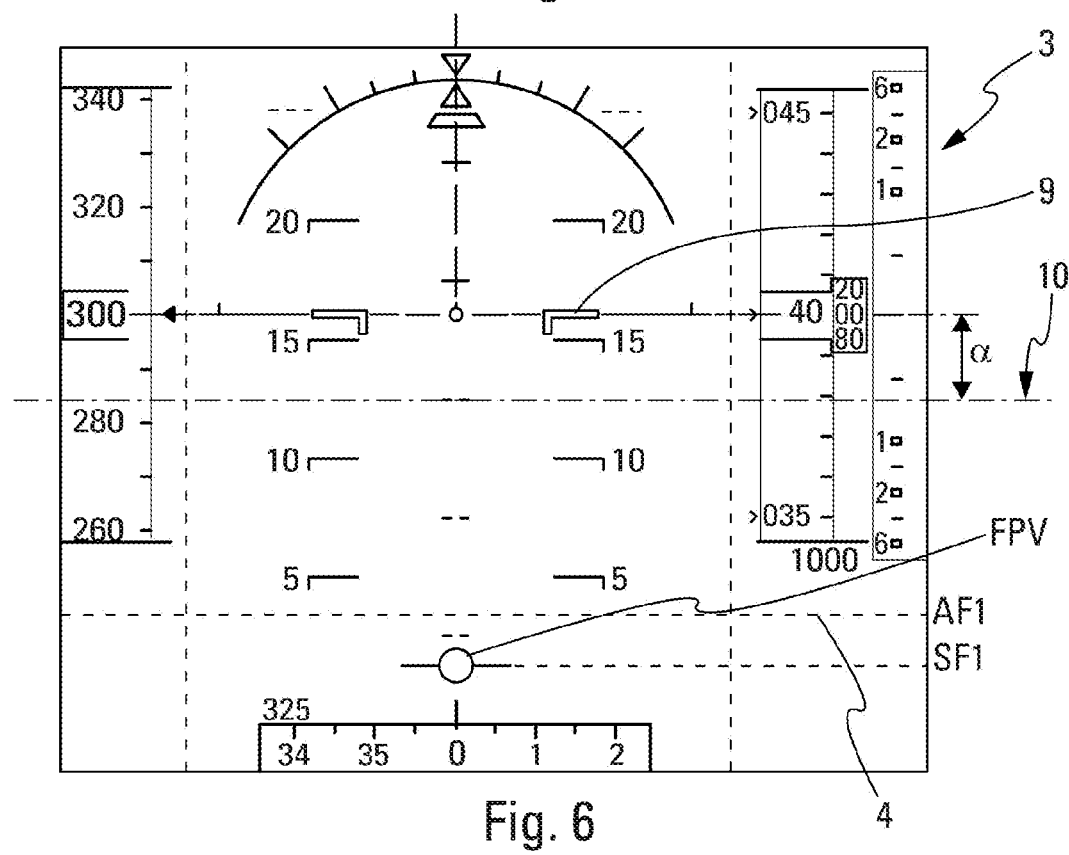
FIG. 6 depicts the display zone in the case whereby the aircraft descends nose-up.

FIGS. 5 and 6 depict the case whereby the aircraft AC climbs.

FIG. 5 illustrates the case whereby the aircraft AC climbs nose-up. In this FIG. 5, the zero pitch reference line 4 is limited to 1.3° below the flight path vector FPV.

FIG. 6 illustrates the case whereby the aircraft AC descends nose-up. In this FIG. 6, the zero pitch reference line 4 is limited to 2° above the flight path vector FPV.

This mechanism allows the pilot of the aircraft AC to know whether the aircraft AC climbs or descends, given that the flight path vector FPV is always depicted relative to the ghosted zero pitch reference line 4.

According to a preferred embodiment, the land topography generating module 7 comprises a terrain zone generating sub-module TERRAIN1 70 configured to generate a terrain zone 12 intended to be displayed on the display zone 3 when the aircraft AC has a pitch angle that is greater than an upper pitch angle that can be displayed on the display zone 3. Similarly, the land topography generating module 7 comprises a sky zone generating sub-module SKY 71 configured to generate a sky zone 13 intended to be displayed on the display zone 3 when the aircraft AC has a pitch angle that is lower than a lower pitch angle that can be displayed on the display zone 3.

Figure 7:
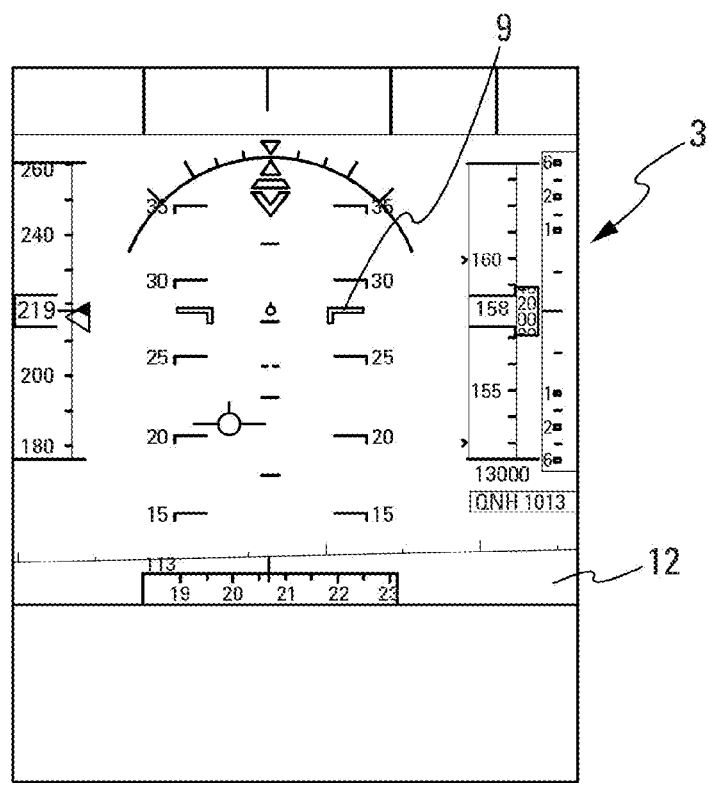
FIG. 7 depicts the display zone in the case whereby a terrain zone is added when the pitch angle only causes the sky to be displayed.
Figure 8:
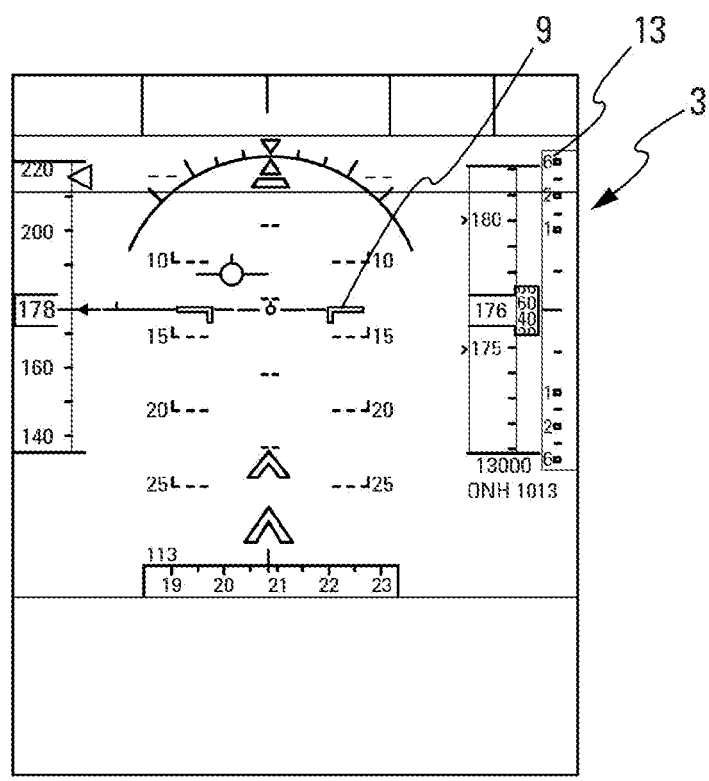
FIG. 8 depicts the display zone in the case whereby a sky zone is added when the pitch angle only causes the terrain to be displayed.

Thus, if the aircraft AC has a pitch angle that only causes the sky to be displayed on the display zone 3, a terrain zone 12 is displayed on the bottom of the display zone 3 (FIG. 7). Otherwise (FIG. 8), if the aircraft AC has a pitch angle that only causes the terrain to be displayed on the display zone, a sky zone 13 is displayed at the top of the display zone 3. This thus allows the pilot to be more aware of the attitude of the aircraft AC and to continuously know whether there is a need to climb or to descend, since the pilot can continuously see the direction of the sky or the direction of the terrain.

Furthermore, the symbology generating module 6 can also comprise a flight path director determination sub-module DET4 63 configured to determine a position of a flight path director FPD relative to the mock-up 9 on the display zone 3 from a path order.

Figure 11:
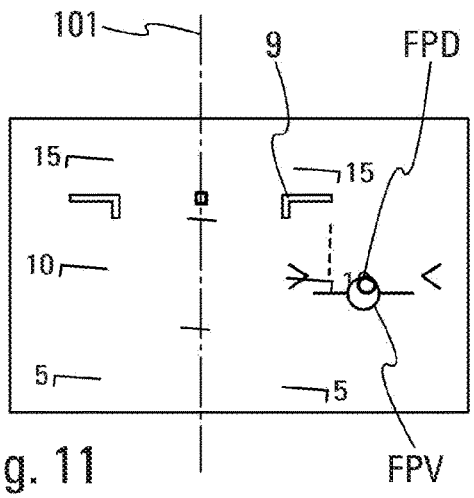
FIG. 11 depicts the flight path vector and the flight path director in their actual positions relative to the median line parallel to the ordinate axis.
Figure 12:
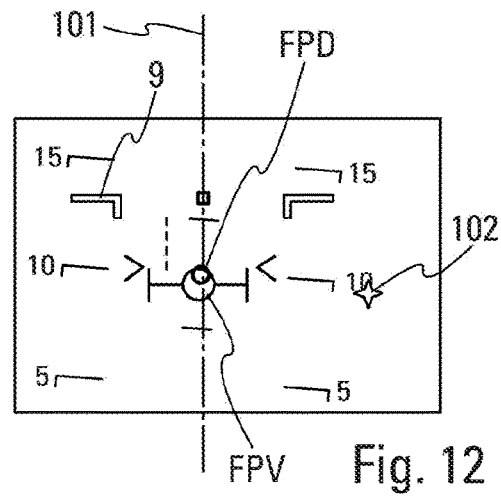
FIG. 12 depicts the flight path vector and the flight path director when the flight path vector is centered on the median line parallel to the ordinate axis.

A flight path director FPD can correspond to a symbol intended to be displayed on the display zone 3. A flight path director FPD depicts a desired Flight Path Angle FPA. Thus, the flight path director FPD is determined from a path order supplied by the pilot of the aircraft AC through an input unit (FIGS. 11 and 12).

If the position of the flight path director FPD is located, on the one hand, between an upper pitch angle AS3 and a lower pitch angle AF3 and, on the other hand, between an upper yaw angle BS1 and a lower yaw angle BF1, the flight path director FPD is intended to be depicted on the display zone 3 in a first configuration.

Figure 10:
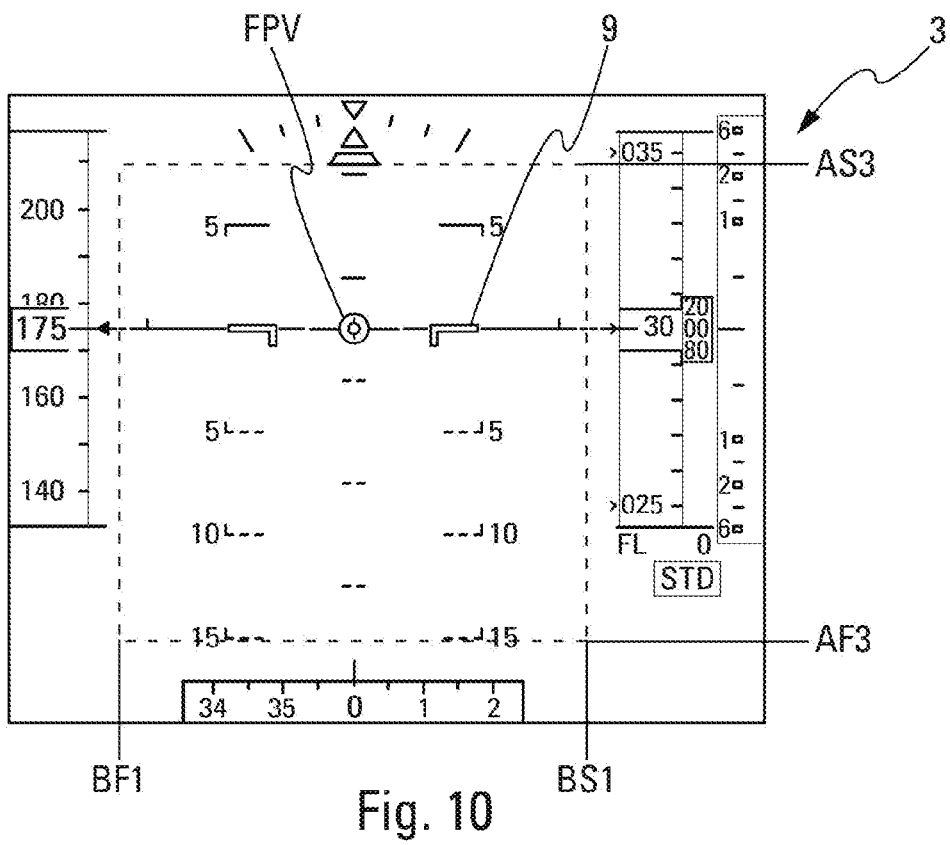
FIG. 10 depicts the pitch and roll angle limits of the flight path director separating the first and the second representation configuration on the display zone.

If the position of the flight path director FPD is located in a position that simultaneously is (FIG. 10):
higher than the upper pitch angle AS3;
lower than the lower pitch angle AF3;
higher than the upper yaw angle BS1; and
lower than the lower yaw angle BF1,
the flight path director FPD is intended to be depicted on the display zone 3 in a second configuration.

If the position of the flight path vector FPV is located, on the one hand, between an upper pitch angle AS4 and a lower pitch angle AF4 and, on the other hand, between an upper yaw angle BS2 and a lower yaw angle BF2, the flight path vector FPV is intended to be depicted on the display zone 3 in the first configuration.

Figure 9:
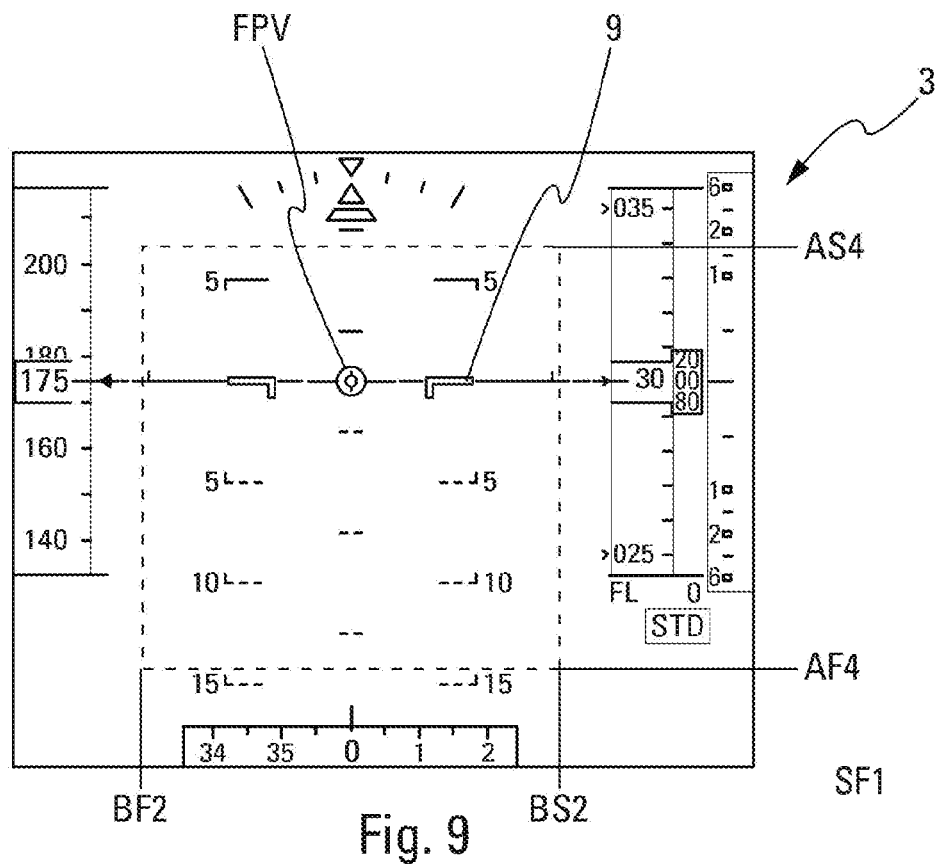
FIG. 9 depicts the pitch and roll angle limits of the flight path vector separating the first and the second representation configuration on the display zone.

If the position of the flight path vector FPV is located in a position that simultaneously is (FIG. 9):
higher than the upper pitch angle AS4;
lower than the lower pitch angle AF4;
higher than the upper yaw angle BS2; and
lower than the lower yaw angle BF2,
the flight path vector FPV is intended to be depicted on the display zone in the second configuration.

The upper pitch angle AS3 is higher than the upper pitch angle AS4.

The lower pitch angle AF3 is lower than the lower pitch angle AF4.

The upper yaw angle BS1 is higher than the upper yaw angle BS2.

The lower yaw angle BF1 is lower than the lower yaw angle BF2.

In a non-limiting manner, the upper pitch angle AS3 equals +8°. The lower pitch angle AF3 equals −15.5°. The upper pitch angle AS4 equals +6.5°. The lower pitch angle AF4 equals −14.7°. The upper yaw angle BS1 equals +11.2°. The lower yaw angle BF1 equals −11.2°. The upper yaw angle BS2 equals +10°. The lower yaw angle BF2 equals −10°.

The first configuration and the second configuration of the representation of the flight path vector FPV and of the flight path director FPD correspond to display modes on the display zone 3.

For example, in the first configuration, the flight path vector FPV and the flight path director FPD are depicted as solid lines, whereas, in the second configuration, they are depicted as dashed lines.

Thus, as the zone in which the flight path director FPD moves is bigger than the zone in which the flight path vector FPV moves, the flight path director FPD is always depicted in a good relative position relative to the flight path vector FPV, even if they are outside their respective zone.

In a particular embodiment depicted in FIGS. 11 and 12, in the event of a strong crosswind, the pilot can activate an FPV locked configuration by sending an order to lock the flight path vector to the symbology generating module 6. The locking order can be transmitted by the pilot using an input unit. In this configuration, the flight path vector FPV is intended to be permanently displayed along the abscissa axis along a median line 101 of the display zone 3 parallel to the ordinate axis as a function of the position determined by the flight path vector determination sub-module 61. Thus, in the "FPV locked" configuration, the flight path vector FPV moves along the median line 101 as a function of the pitch angle originating from the position determined by the flight path vector determination sub-module 61. The flight path director FPD is intended to be depicted relative to the flight path vector FPV. The position of the flight path director FPD also can be limited by pitch angle. In a non-limiting manner, the position of the flight path director FPD is limited between +6.5° and −14.7° by pitch angle. Furthermore, the actual position of the flight path vector FPV, i.e. the position relative to the mock-up 9 on the display zone 3 determined by the flight path vector determination sub-module 61 (by pitch angle and by yaw angle) is depicted using an auxiliary symbol 102.

Furthermore, the symbology generating module 6 can comprise a roll scale generating module ROLL 64 configured to generate a roll scale 11 intended to be displayed on the display zone 3.

If the aircraft AC has a roll angle between a roll angle PA1 and a roll angle PA2, the displayed roll scale 11 is limited between the roll angle PA1 and the roll angle PA2.

If the aircraft AC has a roll angle lower than the roll angle PA1 or higher than the roll angle PA2, the roll scale 11 is extended between a roll angle PA3 lower than the roll angle PA1 and a roll angle PA4 higher than the roll angle PA2.

Figure 13:
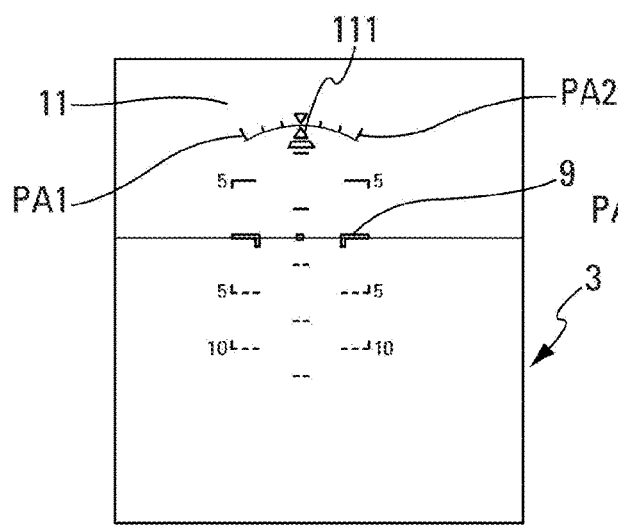
FIG. 13 depicts the roll scale on the display zone when the aircraft has a roll angle between the first roll angle and the second roll angle.

FIG. 13 depicts the case whereby the aircraft AC has a roll angle between the roll angle PA1 and the roll angle PA2. The symbol 111 indicates the roll angle on the roll scale 11.

Figure 14:
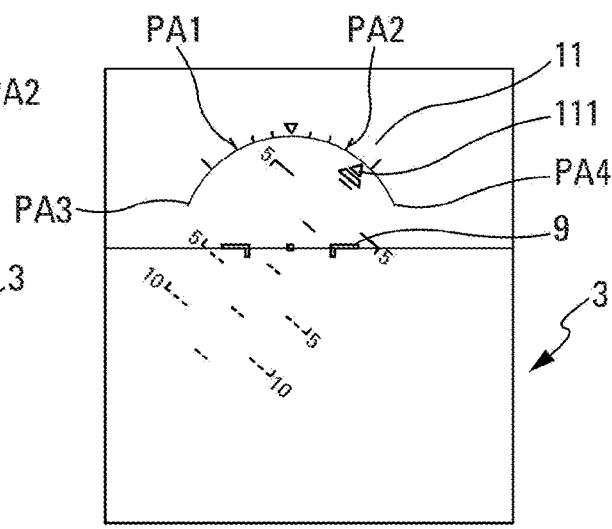
FIG. 14 depicts the roll scale on the display zone when the aircraft has a roll angle that is greater than the second roll angle.

FIG. 14 depicts the case whereby the aircraft AC has a roll angle that is higher than the roll angle PA2.

In a non-limiting manner, the roll angle PA1 equals −30° and the roll angle PA2 equals +30°.

Figure 15:
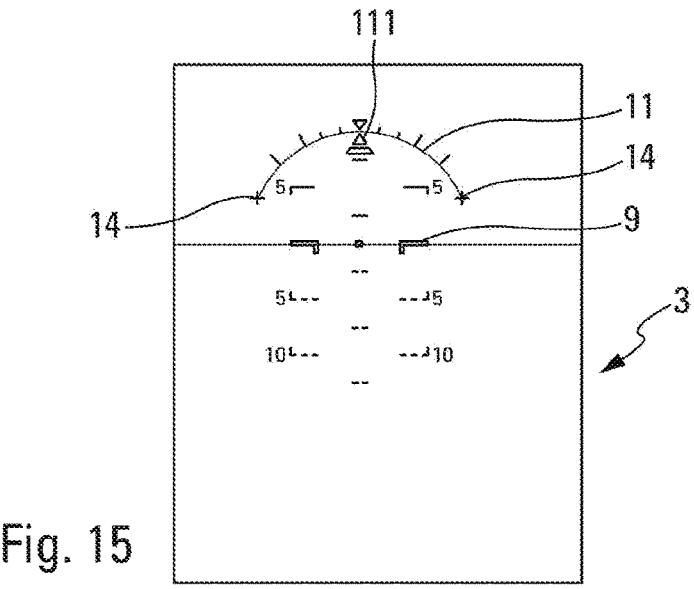
FIG. 15 depicts the roll scale on the display zone when the aircraft has a roll angle that is greater than the second roll angle, as well as the symbol indicating the activation or the non-activation of the roll safeguards.

Furthermore, a symbol 14 indicating the roll safeguards can be displayed when the roll scale 11 is extended (FIG. 15). The symbol 14 for the roll safeguards can have a different color depending on the activation or the non-activation of the roll safeguards. For example, the symbol 14 can be green when the roll safeguards are activated and orange when the roll safeguards are not activated. The activation or the non-activation of the roll safeguards can be information that is provided by a sensor configured to detect the activation or the non-activation of the roll safeguards.

Furthermore, the land topography generating module 7 can comprise a terrain generating sub-module TERRAIN2 72 configured so that the synthetic representation of the land topography of the terrain overflown by the aircraft AC comprises a first zone with a first color (for example, brown) representing the overflown terrain and a second zone with a second color (for example, blue) representing the sky. This terrain generating module 72 is implemented when the aircraft AC has a roll angle that is higher than an absolute value of a limit roll angle.

Figure 16:
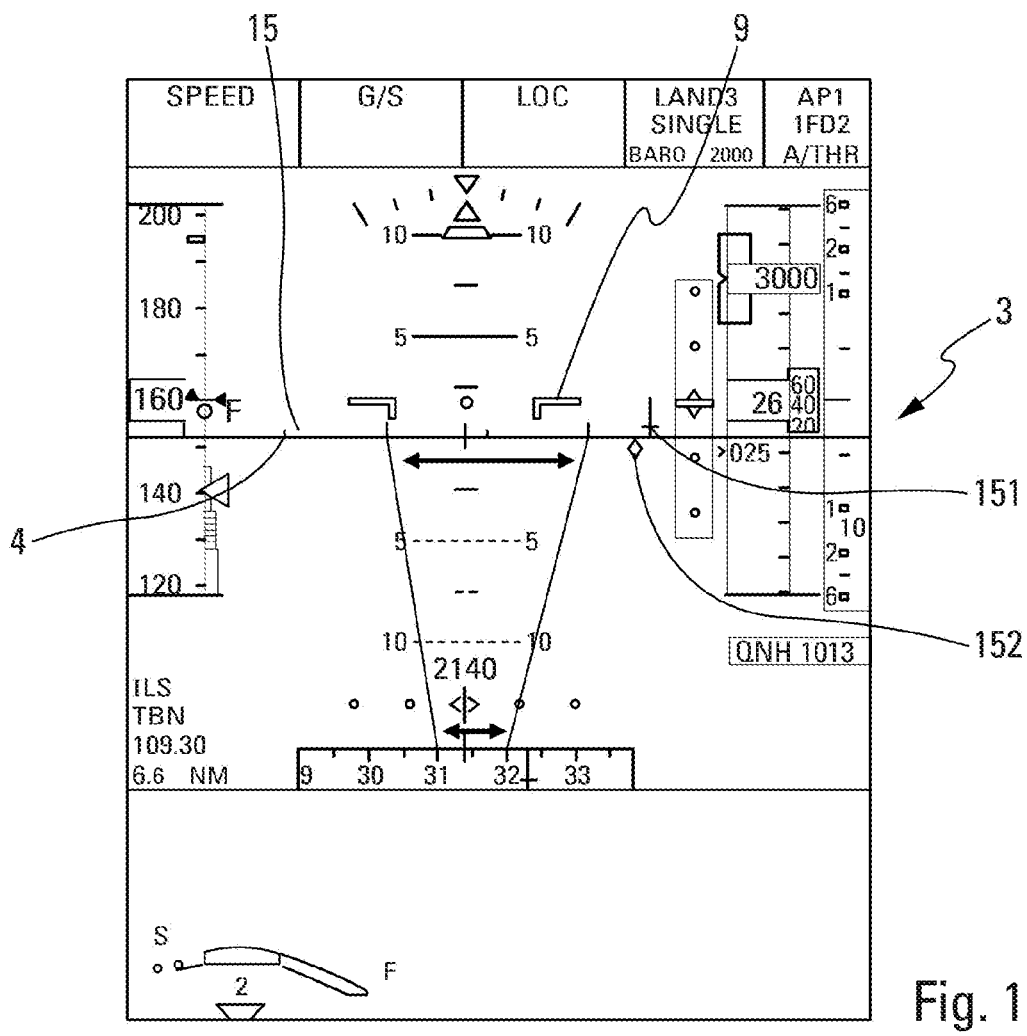
FIG. 16 depicts the heading scale coincident with the zero pitch reference line.

Furthermore, the symbology generating module 6 can comprise a heading scale generating sub-module HEAD 65 configured to generate a heading scale 15 intended to be displayed on the display zone 3. The heading scale 15 is coincident with the zero pitch reference line 4. This means that the heading scale 15 corresponds to a graduation of the zero pitch reference line 4, as shown in FIG. 16.

The heading scale 15 is adapted to the synthetic representation of the land topography of the terrain overflown by the aircraft AC generated by the land topography generating module 7.

The heading scale 15 comprises a symbol 151 indicating the current heading of the aircraft AC having a position on the heading scale 15 that is determined from the heading acquired by the acquisition module 5 and a symbol 152 indicating a selected heading having a position that is determined from a heading order. The heading order can be provided by the pilot through an input unit.

Furthermore, the symbology generating module 6 can comprise a pitch scale generating sub-module PITCH 66. The pitch scale generating sub-module 66 is configured to generate a pitch scale 16 between −20° and +20°. The pitch scale 16 generated by the pitch scale generating module is intended to be displayed on the display zone 3. Then, the pitch scale 16 thus generated corresponds to an expanded pitch scale compared to a normal pitch scale. In a non-limiting manner, the expansion rate equals 2.4.

This expansion of the pitch scale 16 allows the pilot to be more aware of the aspect of the terrain overflown by the aircraft AC.

Figure 17:
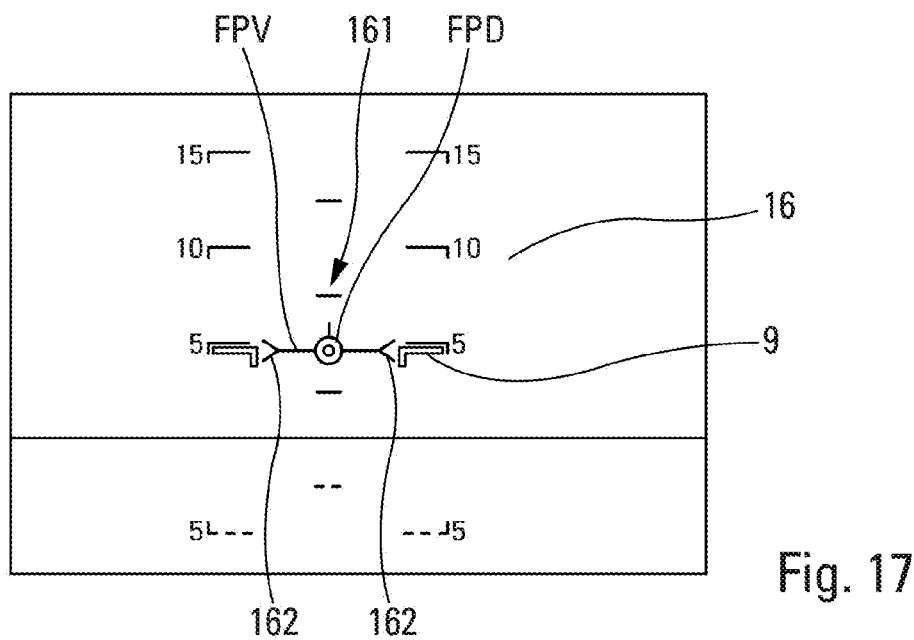
FIG. 17 depicts the relative sizes between the pitch scale, the flight path vector, the mock-up and the chevrons.

The pitch scale 16 can comprise graduations extending over a width that equals the width of the mock-up 9. Each of the graduations has a central break 161, the width of which equals the width of the flight path vector FPV, and chevrons 162 representing the energy of the aircraft AC (FIG. 17).

Figure 18:
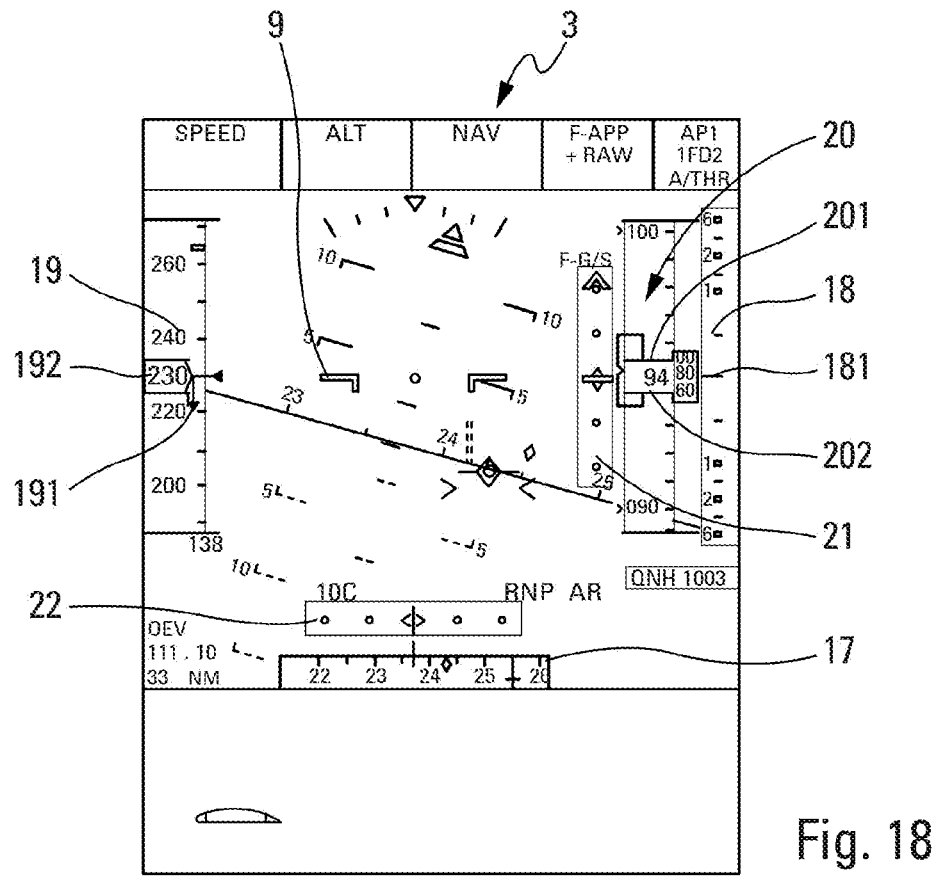
FIG. 18 depicts the display zone with the various scales, including the vertical guidance scale and the lateral guidance scale.

Furthermore, the symbology generating module 6 can comprise a speed and altitude scales generating sub-module SP/ALT 67. The speed and altitude scales generating sub-module 67 is configured to generate at least one heading scale 17, one vertical speed scale 18, one speed scale 19 and one altitude scale 20 (FIG. 18). Each scale comprises an indicator symbol 181, 191, 201, the position of which on each scale respectively depicts a current heading, a current vertical speed, a current speed and a current altitude. The position of each indicator 181, 191, 201 is determined from current flight parameters. The speed scale 19, the vertical speed scale 18 and the altitude scale 20 are intended to be vertically depicted on the display zone 3 near to the lateral edges of the display zone 3 and are centered relative to the mock-up 9. Furthermore, a digital display 192 of the current speed can be depicted superimposed on the speed scale 19, in order to avoid any ambiguity in reading the current speed on the scale 19. Similarly, a digital display 202 of the current altitude can be depicted superimposed on the altitude scale 20. The heading scale 17 is intended to be horizontally depicted on the display zone 3 near to the lower edge of the display zone 3. The display of these scales allows a usable attitude zone to be obtained that is 2.3 times that of a display zone of a conventional display device.

Figure 19:
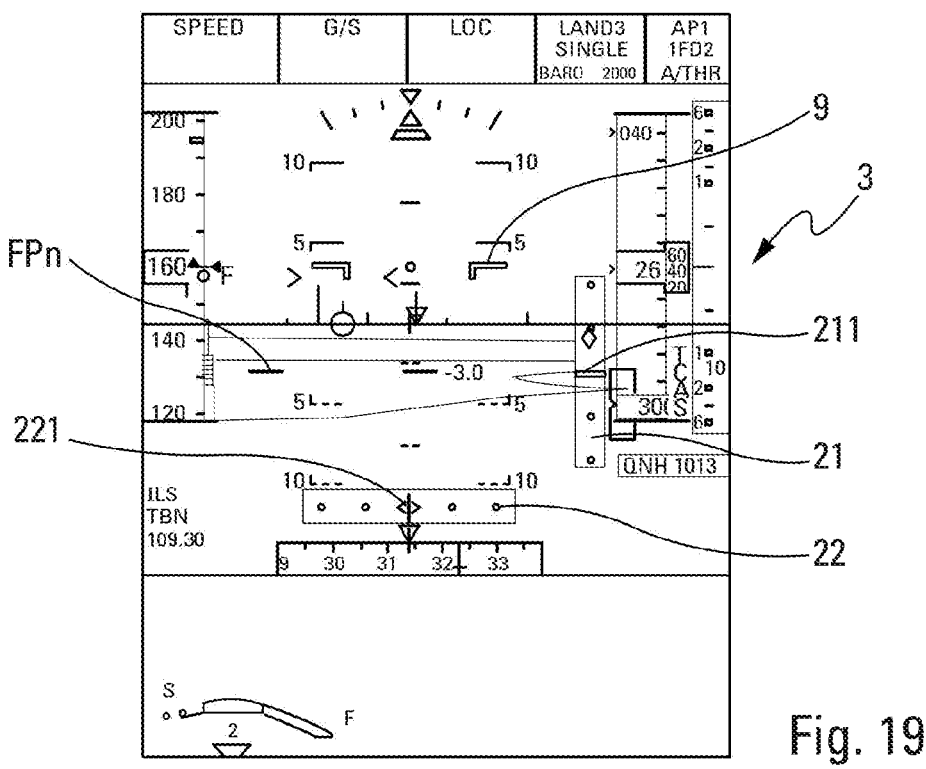
FIG. 19 depicts the display zone in which the vertical guidance scale is aligned with the flight path angle.

Furthermore, the symbology generating module 6 can comprise a guidance scales generating sub-module GUID 68. The guidance generating sub-module 68 is configured to generate at least one vertical guidance scale 21 and one lateral guidance scale 22 (FIGS. 18 and 19). The vertical guidance scale 21 indicates a current vertical gap between a reference approach path and the current position of the aircraft. The lateral guidance scale indicates a current lateral gap between the reference approach path and the current position of the aircraft AC. The vertical guidance scale 21 comprises an indicator symbol 211, the position of which is determined from a vertical guidance signal, also called descent alignment signal, allowing the aircraft AC to know the vertical gap that it has with the reference approach path. This vertical guidance signal is generally denoted "Glide signal" or "signal Glide slope". The lateral guidance scale comprises an indicator symbol 221, the position of which is determined from a lateral guidance signal, also called runway alignment signal, allowing the aircraft AC to know the lateral gap that it has with the reference approach path. This lateral guidance signal is generally called "Localizer signal". The lateral guidance scale 22 is intended to be depicted near the heading scale 17. The vertical guidance scale 21 is intended to be depicted near the altitude scale 20.

The symbology generating module 6 can comprise a flight path angle symbol generating sub-module FPAGEN 69. The flight path angle generating sub-module 69 is configured to generate at least one flight path angle FPA symbol intended to be displayed on the display zone 3 (FIG. 19). The flight path angle FPA symbol can correspond to at least one line indicating the current flight path angle of the aircraft AC. The position of said symbol is determined relative to the pitch scale 66 from the flight parameters. Advantageously, the vertical guidance scale is aligned with the flight path angle FPA symbol (FIG. 19).

The various symbols generated by the symbology generating module 6 are depicted on the display zone 3 with between 40% and 60% opacity.

For example, in the case whereby the land topography generating module 7 implements the terrain zone generating sub-module 70 and the sky zone generating sub-module 71, the opacity equals 60%. The lower part is depicted by a black zone.

When the synthetic representation of the land topography of the terrain overflown by the aircraft AC is displayed, the opacity of the lower part of the display zone 3 equals 40% during flight and during the approach phase. It equals 60% in the other cases.

The invention also relates to a landing assistance method.

The method comprises:

an acquisition step E1, implemented by the acquisition module 5, involving acquiring the environment data and the current flight parameters of the aircraft AC, at least including an attitude, an altitude, a three-dimensional position and a heading parameter;

a symbology generating step E2, implemented by the symbology generating module 6, involving generating a flight and navigation symbology to be displayed on the display device 2 from at least the current flight parameters;

a land topography generating step E3, implemented by the land topography generating module 7, involving generating the synthetic representation of a land topography of terrain overflown by the aircraft AC at least from the attitude, the heading, the three-dimensional position and the environment data;

a transmission step E4, implemented by the transmission module 8, involving transmitting a signal to the display device 2 that represents the flight and navigation symbology and the synthetic representation.

The symbology generating step E2 comprises at least one sub-step E20 of determining the position of a mock-up, implemented by the mock-up position determination sub-module 60, involving determining the display position of a mock-up 9 of the aircraft AC on the display zone 3. The position of the mock-up 9 is determined so that the mock-up 9 is displayed at a predetermined non-zero positive pitch angle α relative to a median line 10 of the display zone 3. The median line 10 corresponds to the median line parallel to the abscissa axis.

The symbology generating step E2 can also comprise:
a sub-step E21 of determining a flight path vector, implemented by the flight path vector determination sub-module 61, involving determining the position of the flight path vector FPV relative to the mock-up 9 on the display zone 3 at least from the attitude;

a sub-step E22 of determining the position of the zero pitch line, implemented by the zero pitch position determination sub-module 62, involving determining the position of the zero pitch reference line 4 on the display zone 3 at least from the attitude, The land topography generating step E3 can comprise a terrain zone generating sub-step E30, implemented by the terrain zone generating sub-module 70, involving generating the terrain zone 12 intended to be displayed on the display zone 3 when the aircraft AC has a pitch angle that is greater than an upper pitch angle that can be displayed on the display zone 3.

Furthermore, the land topography generating step E3 comprises a sky zone generating sub-step E31, implemented by the sky zone generating sub-module 71, involving generating the sky zone 13 intended to be displayed on the display zone 3 when the aircraft AC has a pitch angle that is lower than a lower pitch angle that can be displayed on the display zone 3.

The symbology generating step E2 can comprise a flight path director determination sub-step E23, implemented by the flight path director determination sub-module 63, involving determining the position of the flight path director FPD relative to the mock-up 9 on the display zone 3 from a path order.

The symbology generating step E2 can comprise a roll scale generating sub-step E24, implemented by the roll scale generating sub-module 64, involving generating the roll scale 11 intended to be displayed on the display zone 3.

Furthermore, the land topography generating step E3 can comprise a terrain generating sub-step E32, implemented by the terrain generating sub-module 72, involving the synthetic representation of the land topography of the terrain overflown by the aircraft AC comprising a first zone with a first color representing the overflown terrain and a second zone with a second color representing the sky, when the aircraft AC has a roll angle greater than an absolute value of a limit roll angle.

The symbology generating step E2 can comprise a heading scale generating sub-step E25, implemented by the heading scale generating sub-module 65, involving generating the heading scale 15 intended to be displayed on the display zone 3. The heading scale 15 is coincident with the zero pitch reference line 4. The heading scale 15 is adapted to the synthetic representation of the land topography of the terrain overflown by the aircraft AC generated in the land topography generating step E3.

The symbology generating step E2 can comprise a pitch scale generating sub-step E26, implemented by the pitch scale generating sub-module 66, involving generating the pitch scale 16 between −20° and +20°.

The symbology generating step E2 can comprise a speed and altitude scales generating sub-step E27, implemented by the speed and altitude scales generating sub-module 67, involving generating at least the heading scale 17, the vertical speed scale, the speed scale and the altitude scale intended to be displayed on the display zone 3. Furthermore, a digital display of the current speed can be depicted superimposed on the speed scale in order to avoid any ambiguity reading the current speed on the scale. Similarly, a digital display of the current altitude can be depicted superimposed on the altitude scale.

The symbology generating step E2 can comprise a guidance scales generating sub-step E28, implemented by the guidance scales generating sub-module 68, involving generating at least the vertical guidance scale and the lateral guidance scale.

The symbology generating step E2 can comprise a flight path angle symbol generating sub-step E29, implemented by the flight path angle symbol generating sub-module 69, involving generating at least the flight path angle FPA symbol intended to be displayed on the display zone 3.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A landing assistance method associated with a display device of an aircraft, the display device configured to display a flight and navigation symbology on a display zone, the display zone having a coordinate system, which includes an abscissa axis indicating a yaw angle relative to a zero yaw reference line and an ordinate axis indicating a pitch angle of the aircraft relative to a zero pitch reference line,
wherein the method comprises:
an acquisition step, implemented by an acquisition module, involving acquiring environment data and current flight parameters of the aircraft, at least including an attitude, an altitude, a three-dimensional position and one heading parameter;

a symbology generating step, implemented by a symbology generating module, involving generating a flight and navigation symbology to be displayed on the display device from at least the current flight parameters;

a land topography generating step, implemented by a land topography generating module, involving generating a synthetic representation of a land topography of terrain overflown by the aircraft from at least the attitude, the heading, the three-dimensional position and the environment data; and a transmission step, implemented by a transmission module, involving transmitting a signal to the display device that represents the flight and navigation symbology and the synthetic representation;

wherein the symbology generating step comprises at least one sub step of determining the position of a mock up, implemented by a mock up position determination sub-module, involving determining a display position of a mock-up of the aircraft on the display zone, the position of the mock up determined so that the mock-up is displayed at a predetermined non-zero positive pitch angle relative to a median line of the display zone, wherein the median line is parallel to the abscissa axis, wherein the land topography generating step comprises a sub step of generating a terrain zone, implemented by a terrain zone generating sub-module, involving generating a terrain zone configured to be displayed at the bottom of the display zone when the aircraft has a first pitch angle that is higher than an upper pitch angle that can be displayed on the display zone, wherein in an absence of the terrain zone generating step, the first pitch angle would cause only sky to be displayed on the display zone without the terrain zone displayed at the bottom of the display;

and the land topography generating step comprises a sub step of generating a sky zone, implemented by a sky zone generating sub-module, involving generating a sky zone configured to be displayed at the top of the display zone when the aircraft has a second pitch angle that is lower than a lower pitch angle that can be displayed on the display zone, wherein in an absence of the sky zone generating step, the second pitch angle would cause only a terrain to be displayed on the display zone without the sky zone displayed at the top of the display.

2. The method as claimed in claim 1, wherein the symbology generating step comprises:

a sub-step of determining a flight path vector, implemented by a flight path vector determination sub-module, involving determining a position of a flight path vector relative to the mock-up on the display zone at least from the attitude;

a sub-step of determining the position of the zero pitch line, implemented by a zero pitch position determination sub-module, involving determining a position of the zero pitch reference line on the display zone at least from the attitude, if the position of the flight path vector determined in the sub-step of determining a flight path vector is below a lower pitch angle threshold, the zero pitch reference line is configured to be depicted on the display zone between a first upper pitch angle relative to the flight path vector and a first lower pitch angle relative to the flight path vector, and if the position of the flight path vector determined in the sub-step of determining a flight path vector is above an upper pitch angle threshold, the zero pitch reference line is configured to be depicted on the display zone between a second upper pitch angle and a second lower pitch angle.

3. The method as claimed in claim 2, wherein the symbology generating step comprises a sub-step of determining a flight path director, implemented by a flight path director determination sub-module, involving determining a position of a flight path director relative to the mock-up on the display zone from a path order;

if the position of the flight path director is located, on the one hand, between a third upper pitch angle and a third lower pitch angle and, on the other hand, between a first upper yaw angle and a first lower yaw angle, the flight path director is configured to be depicted on the display zone in a first configuration;

if the position of the flight path director is located in a position that is simultaneously higher than the third upper pitch angle, lower than the third lower pitch angle, higher than the first upper yaw angle and lower than the first lower yaw angle, the flight path director is configured to be depicted on the display zone in a second configuration;

if the position of the flight path vector is located, on the one hand, between a fourth upper pitch angle lower than the third pitch angle and a fourth lower pitch angle higher than the third lower pitch angle and, on the other hand, between a second upper pitch angle lower than the first upper yaw angle and a second lower yaw angle higher than the first lower yaw angle, the flight path vector is configured to be depicted on the display zone in the first configuration; and if the position of the flight path vector is located in a position that is simultaneously higher than the fourth upper pitch angle, lower than the fourth lower pitch angle, higher than the second upper yaw angle and lower than the second lower yaw angle, the flight path vector is configured to be depicted on the display zone in the second configuration.

4. The method as claimed in claim 1, wherein the symbology generating step comprises a sub-step of generating a roll scale, implemented by a roll scale generating sub-module, involving generating a roll scale intended to be displayed on the display zone, if the aircraft has a roll angle between a first roll angle and a second roll angle, the roll scale is limited between the first roll angle and the second roll angle, and if the aircraft has a roll angle lower than the first roll angle or higher than the second roll angle, the roll scale is extended between a third roll angle lower than the first roll angle and a fourth roll angle higher than the second roll angle.

5. The method as claimed in claim 1, wherein the symbology generating step comprises a sub-step of generating a heading scale, implemented by a heading scale generating sub-module, involving generating a heading scale configured to be displayed on the display zone, wherein the heading scale is coincident with the zero pitch reference line, and the heading scale is adapted to the synthetic representation of the land topography of the terrain overflown by the aircraft generated in the land topography generating step, the heading scale comprising a first symbol indicating the current heading of the aircraft having a position on the heading scale that is determined from the heading acquired in the acquisition step and a second symbol indicating a selected heading having a position that is determined from a heading order.

6. The method as claimed in claim 1, wherein the symbology generating step comprises a sub-step of generating a pitch scale, implemented by a pitch scale generating sub-module, involving generating a pitch scale between −20° and +20°.

7. A landing assistance system associated with a display device of an aircraft, the display device configured to display a flight and navigation symbology on a display zone, the display zone having a coordinate system, which includes an abscissa axis indicating a yaw angle relative to a zero yaw reference line and an ordinate axis indicating a pitch axis of the aircraft relative to a zero pitch reference line, wherein the system comprises at least:

an acquisition module configured to acquire environment data and current flight parameters of the aircraft, at least including an attitude, an altitude, a three-dimensional position and a heading parameter;

a symbology generating module configured to generate a flight and navigation symbology to be displayed on the display device at least from the current flight parameters;

a land topography generating module configured to generate a synthetic representation of a land topography of terrain overflown by the aircraft from at least the attitude, the heading, the three-dimensional position and the environment data; and a transmission module configured to transmit a signal to the display device that represents the flight and navigation symbology and the synthetic representation;

wherein the symbology generating module comprises at least one mock-up position determination sub-module configured to determine a display position of a mock-up of the aircraft on the display zone, the position of the mock up determined so that the mock up is displayed at a predetermined non-zero positive pitch angle relative to a median line of the display zone, the median line being parallel to the abscissa axis, wherein the land topography generating module is configured to generate a terrain zone, implemented by a terrain zone generating sub-module, involving generating a terrain zone configured to be displayed at the bottom of the display zone when the aircraft has a first pitch angle that is higher than an upper pitch angle that can be displayed on the display zone, wherein in absence of the terrain generating sub-module, the land topography generating module would be configured to display only sky as a function of the first pitch angle without displaying the terrain zone at the bottom of the display;

and the land topography generating module is configured to generate a sky zone, implemented by a sky zone generating sub-module, involving generating a sky zone configured to be displayed at the top of the display zone when the aircraft has a second pitch angle that is lower than a lower pitch angle that can be displayed on the display zone, wherein in absence of the sky zone generating sub-module, the land topography generating module would be configured to display only a terrain as a function of the second pitch angle without displaying the sky zone at the top of the display.

8. The system as claimed in claim 7, wherein the symbology generating module further comprises:

a flight path vector determination sub-module configured to determine a position of a flight path vector relative to the mock-up on the display zone at least from the attitude; and a zero pitch position determination sub-module configured to determine a position of the zero pitch reference line on the display zone at least from the attitude, wherein, if the position of the flight path vector determined by the flight path vector determination sub-module is below a lower pitch angle threshold, the zero pitch reference line is configured to be depicted on the display zone between a first upper pitch angle relative to the flight path vector and a first lower pitch angle relative to the flight path vector, and if the position of the flight path vector determined in the flight path vector determination sub-module is above an upper pitch angle threshold, the zero pitch reference line is configured to be depicted on the display zone between a second upper pitch angle and a second lower pitch angle.

9. The system as claimed in claim 8, wherein the symbology generating module comprises a flight path director determination sub-module configured to determine a position of a flight path director relative to the mock-up on the display zone from a path order;

wherein, if the position of the flight path director is located, on the one hand, between a third upper pitch angle and a third lower pitch angle and, on the other hand, between a first upper yaw angle and a first lower yaw angle, the flight path director is configured to be depicted on the display zone in a first configuration;

if the position of the flight path director is located in a position that is simultaneously higher than the third upper pitch angle, lower than the third lower pitch angle, higher than the first upper yaw angle and lower than the first lower yaw angle, the flight path director is configured to be depicted on the display zone in a second configuration;

if the position of the flight path vector is located, on the one hand, between a fourth upper pitch angle lower than the third pitch angle and a fourth lower pitch angle higher than the third lower pitch angle and, on the other hand, between a second upper yaw angle lower than the first upper yaw angle and a second lower yaw angle higher than the first lower yaw angle, the flight path vector is configured to be depicted on the display zone in the first configuration; and if the position of the flight path vector is located in a position that is simultaneously higher than the fourth upper pitch angle, lower than the fourth lower pitch angle, higher than the second upper yaw angle and lower than the second lower yaw angle, the flight path vector is configured to be depicted on the display zone in the second configuration.

10. The system as claimed in claim 8,
wherein the symbology generating module comprises a roll scale generating sub-module configured to generate a roll scale intended to be displayed on the display zone,
wherein,
if the aircraft has a roll angle between a first roll angle and a second roll angle, the roll scale is limited between the first roll angle and the second roll angle, and
if the aircraft has a roll angle lower than the first roll angle or higher than the second roll angle, the roll scale is extended between a third roll angle lower than the first roll angle and a fourth roll angle higher than the second roll angle (PA2).

11. The system as claimed in claim 7,
wherein the symbology generating module comprises a heading scale generating sub-module configured to generate a first heading scale configured to be displayed on the display zone, wherein the first heading scale is coincident with the zero pitch reference line, and the first heading scale is adapted to the synthetic representation of the land topography of the terrain overflown by the aircraft generated in the land topography generating step,
wherein the first heading scale comprises a first symbol indicating the current heading of the aircraft having a position on the first heading scale that is determined from the heading acquired by the acquisition module and a second symbol indicating a selected heading having a position that is determined from a heading order.

12. The system as claimed in claim 7,
wherein the symbology generating module comprises a pitch scale generating sub-module configured to generate a pitch scale between −20° and +20°.

13. The system as claimed in claim 8,
wherein, when an order to lock the flight path vector is transmitted to the symbology generating module, the flight path vector is configured to be permanently displayed along the abscissa axis along a median line of the display zone parallel to the ordinate axis as a function of the position determined by the flight path vector determination sub-module,
the flight path director is configured to be detected on the display zone relative to the flight path vector, and
an auxiliary symbol is configured to be displayed on the display zone in a position relative to the mock-up on the display zone that corresponds to the position of the flight path vector determined by the flight path vector determination sub-module.

14. An aircraft comprising a landing assistance system associated with a display device of the aircraft, as specified in claim 7.

* * * * *